United States Patent [19]

LeCover

[11] Patent Number: 5,659,819
[45] Date of Patent: Aug. 19, 1997

[54] APPARATUS FOR TAKING PICTURES AGAINST WHITE BACKGROUNDS

[76] Inventor: Maurice LeCover, 8473 Canoga Ave., Canoga Park, Calif. 11304

[21] Appl. No.: 533,261

[22] Filed: Sep. 25, 1995

[51] Int. Cl.$^6$ .............................. G03B 15/03; G03B 27/54
[52] U.S. Cl. ......................... 396/164; 346/182; 346/183; 346/189; 355/70; 355/71
[58] Field of Search ...................... 354/132; 355/67–71, 355/77; 396/164, 182, 183, 189

[56] References Cited

U.S. PATENT DOCUMENTS

| | | |
|---|---|---|
| 3,627,416 | 12/1971 | Benson . |
| 3,738,748 | 6/1973 | Weihsmantel et al. ................. 355/121 |
| 3,860,341 | 1/1975 | Tobias ..................................... 355/115 |
| 3,888,583 | 6/1975 | Kiefer et al. ............................ 355/71 |
| 4,290,692 | 9/1981 | Svatek ..................................... 355/69 |
| 4,899,188 | 2/1990 | Lecover ................................... 396/432 |

*Primary Examiner*—D. Rutledge
*Attorney, Agent, or Firm*—Erik M. Arnhem

[57] ABSTRACT

An automatic photography apparatus has an object illuminating mechanism that has a high illumination mode and a low illumination mode. A switching control system is provided so that when the apparatus is used to photograph white background documents the illuminating mechanism is in the low illumination mode during the exposure setting periods; during the shutter-open period the illuminating mechanism is in the high illumination mode, so as to achieve sufficient exposure to capture the white background. The switching control system can be actuated to allow the camera to photograph documents and scenes having non-white backgrounds; in such situations the object illuminating mechanism is in the high illumination mode during the exposure lock-in stage and during the shutter-open stage.

4 Claims, 1 Drawing Sheet

FIG. 1

APPARATUS FOR TAKING PICTURES AGAINST WHITE BACKGROUNDS

BACKGROUND OF THE INVENTION

1. Field of The Invention

This invention relates to photographic apparatus, and particularly to a photographic apparatus having an exposure control system that compensates for differences in background brightness.

2. Prior Developments

Pathologists, and others in the scientific area, often are required to take photographs of surgical specimens, charts and Graphs. One of the photographic techniques involves the use of a 35 mm film recorder. The recorder comprises a rectangular light box (cabinet) having an interior light source. A plate glass panel is placed over a colored plastic sheet to form the top surface of the light box; the specimen or object to be photographed is placed on the glass panel.

In many cases the object is illuminated by two or more overhead lamps carried by bracket arms attached to side surfaces of the light box. The lamps are targeted onto the object from different angles, to eliminate shadows that might degrade the picture clarity.

The camera is located above the light box so as to have a downwardly directed view of the object to be photographed. Support for the camera is provided by an upstanding vertical column affixed to the back wall of the light box; the camera is mounted on an arm that rides up and down on the column, whereby the camera field of view can be adjusted or changed in accordance with different size specimens (objects). A motor can be provided on the arm to move the arm and associated camera up or down automatically (i.e. by remote control). The automatic camera system is advantageous in that it can be used by pathologists and technicians having limited photographic skills.

The overhead location of the camera makes it difficult for a person to view the object through the camera view finder. However a viewing system has been devised for viewing and focusing the scene, without requiring the person to look through the camera. As shown in U.S. Pat. No. 4,899,188 to M. Lecover, the camera can be equipped with a built-in recticle. An overhead light source can be aligned with the camera eyepiece to direct light through the camera onto the object and background plate. The image of the recticle is superimposed on the scene to indicate to the person controlling the apparatus the field of view and the focus of the camera lens (i.e. the sharpness or bluriness of the recticle image indicates the need for focus adjustment.

Using the recticle image as a guide, the person can adjust the camera position (up or down) and the lens-film spacing to obtain a relatively sharp picture having a sufficiently sized image of the specimen.

Another method to format and focus the camera involves the use of a video camera and video monitor. The video camera is mounted above the camera to take a picture through the camera eyepiece and camera optical system; the built-in recticle is imaged on the picture, such that a person observing the picture on the video monitor can format and focus the 35 mm camera. The 35 mm camera is operated to take a picture when the image is the correct size and sharply focused, as determined by the video camera-video monitor system.

The above described systems enable the person to format and focus the 35 mm camera on the specimen without the necessity for the person to look through the viewfinder of the camera.

In many cases the person will have to photograph specimens, charts, graphs, statistical tables, etc., against a range of different backgrounds, e.g white paper, darker paper, or merely the glass support panel. Variation in the brightnes, or dimness, of the background creates a problem for the automatic camera especially the exposure control in the camera.

An automatic camera is usually programmed to produce a rendering of an average scene. When the subject is printed, or mounted, on white paper the automatic camera will tend to underexpose the picture, i.e. allow insufficient light to impinge on the film. The resulting photograph may portray the white background as a muddy gray coloration.

With the use of an exposure meter, experienced photographers can compensate for this situation; i.e. by taking an exposure meter reading of the scene to be photographed, and changing the exposure setting on the camera to an overexposure condition. This will cause the white background to appear white in the photograph.

It is possible, but difficult, to accomplish the overexposure condition in an automatic camera. One way to achieve overexposure is to place a gray card over the subject. The exposure lock button on the camera is held down while the gray card is removed, and the shutter switch is actuated along with release of the exposure lock. This locks in the overexposure, so that the photograph is taken with an artificially greater exposure, i.e. a wider opening of the iris aperture.

The above procedure is difficult for a person having only rudimentary photographic experience to accomplish. Also, the procedure is cumbersome, especially when photographing a large subject wherein the camera may be elevated to a point near the upper end of the camera support column; it may be difficult for the technician to reach the exposure lock on the camera while making the necessary adjustments.

SUMMARY OF THE PRESENT INVENTION

The present invention relates to a camera exposure control system that will achieve an overexposure setting on the camera when a picture is to be taken against a white, or bright, background; the overexposure camera setting causes the white background to appear white in the photograph, rather than gray or muddy.

The overexposure control system involves selective extinguishment of certain lamps used in the overhead lighting of the object to be photographed. Assuming four overhead lamps are used to illuminate the object, the camera actuation sequence will involve extingushment of two of the lamps, such that the exposure control in the camera sees a somewhat darkened (less brilliant) scene; the exposure control thus calls for a greater exposure (wider aperture) than would be required by the use of four overhead lamps. After a short time delay, sufficient to lock in the greater exposure, the extinguished lamps are re-energized. During the major part of the time that the camera shutter is open all four of the overhead lamps are energized. The photograph is taken with an artificially increased exposure. Actual exposure takes place with approximately twice the amount of light that would be called for by the white, or bright, background.

The control system of the present invention is designed to be flexible, so that scenes having non-bright (dim) backgrounds can be photographed without the increased exposure used for bright background scenes. A switch system is used to bypass the lamp extinguishment-delayed lamp energization feature that is used for photographing bright scenes.

Further features and details of the invention will be apparent from the attached drawings and description of an illustrative embodiment of the invention.

THE DRAWINGS

DESCRIPTION OF A PREFERRED EMBODIMENT OF THE INVENTION

Figure 1:
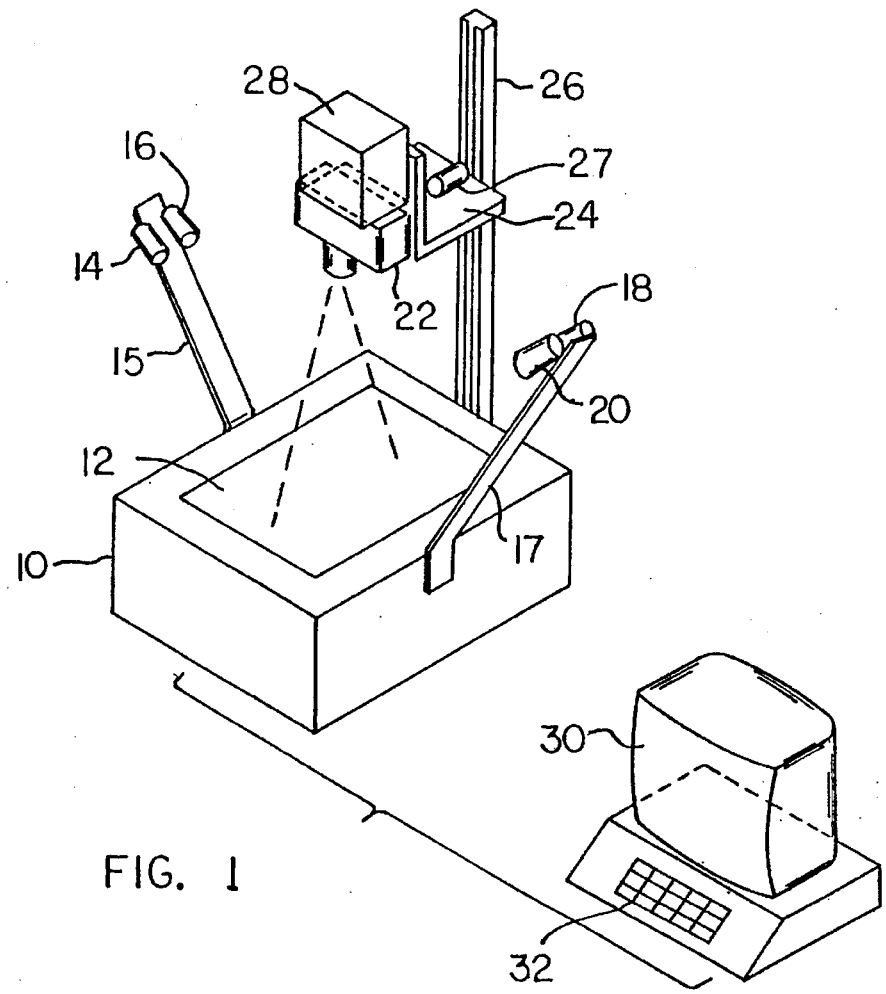
FIG. 1 is a perspective view of a photographic system embodying the invention.

Referring to FIG. 1, there is shown an automatic photograph apparatus embodying the invention. The term automatic is herein used to mean a system in which the camera is formatted, focused, and operated from a remote point, without direct human manipulation of the camera.

The illustrated apparatus comprises a rectangular upstanding light box, or cabinet, 10 having a glass plate 12 mounted in an opening in the box top wall; the specimen or object (subject) to be photographed is placed on plate 12, facing in an upward direction. Plate 12 can be subjected to light rays from lamps located within box 10, to enhance the definition of the specimen. The specimen is illuminated from four overhead lamps 14, 16, 18 and 20 located on bracket arms 15 and 17 attached to side surfaces of box 10. The lamps may be angled or targeted onto a central point on plate 12, to illuminate the specimen and prevent the formation of shadows. The specimen can be a surgical specimen, a three dimensional object, chart, graph, or other document that it is desired to photograph from an overhead camera. A white or colored sheet can be placed underneath the speciman in some cases to better define and outline the specimen.

A 35 mm camera 22 is mounted on an arm 24 that is slidably positioned on an upstanding column 26 affixed to the back wall of box 10. Arm 24 is movable up or down on column 26 by means of a remotely-controlled electric motor 27; a spur gear connected to the motor drive shaft can be in mesh with a toothed rack in column 26 to achieve the desired vertical motion of arm 24 and the attached camera 22. The camera is targeted at a central point on specimen support 12, such that vertical adjustment of the camera changes the camera field of view to correspond with different size specimens.

Camera 22 is provided with a built-in recticle system as shown e.g. in U.S. Pat. No. 4,899,188 to M. Lecover. A videocamera 28 is positioned on arm 24 in optical alignment with the camera eyepiece, such that the videocamera sees the same scene as camera 22. Camera 22 is preferably a single lens reflex camera, e.g. a 35 mm camera, wherein the picture-taking lens system is used for view finding purposes.

Videocamera 28 is coupled to a video monitor 30 that displays the picture taken by the video camera 22. Thus, an image of the rectile in camera 22 can be displayed on monitor 30 for use in formatting and focusing camera on the specimen on plate 12.

Figure 2:
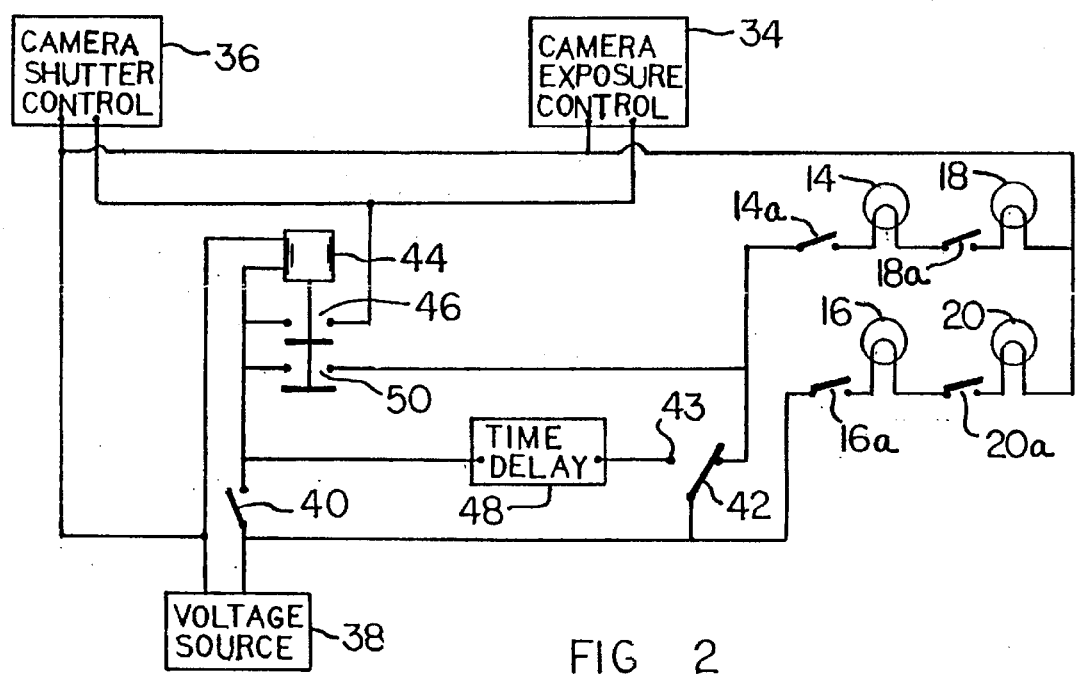
FIG. 2 is a simplified circuit diagram of an electric exposure control circuit used in the FIG. 1 photographic system.

Monitor 30 is physically connected to a base or keyboard 32 containing the circuitry depicted in FIG. 2 of the drawings. Base (keyboard) 32 further contains the controls for motor 27, such that the camera 22 can be controlled and operated by a person seated in front of keyboard 32; the person does not have to physically manipulate controls on the camera.

Camera 22 is equipped with a built-in exposure control 34 (FIG. 2) of conventional design. Typically the exposure control includes a photovoltaic cell (e.g. selenium) or a photoconductive cell (e.g. cadmium sulfide) that senses the scene to be photographed (on plate 12), and generates a signal related to the brightness of the scene. The signal is applied to a control in the camera that energizes a small motor for controlling the size of the aperture provided by the diaphragm (iris), hence the light admitted to the film; this controls the exposure. In some cameras the exposure is controlled by controlling the duration of the shutter-open period. For purposes of the present invention, the exposure is controlled by the aperture size.

Camera 22 is also provided with a shutter control 36 (FIG. 2) that is controllable, electrically from a remote point, e.g. keyboard 32. In the circuit depicted in FIG. 2 the camera lighting and camera actuation are controlled electrically, using a voltage source 38 that may be an A.C. source or a D.C. Source.

Exposure control 34 and shutter control 36 operate together (in conjuction), to provide the necessary combination of aperture size and shutter open time, to achieve the desired film exposure.

The camera is operated in two different ways or modes. When the camera is to take a picture of a subject with a relatively dim background (e.g. a specimen without a background sheet or a specimen positioned on a gray or dull background sheet), the camera actuation is accomplished by closing switch 40. When camera 22 is to be used to take a picture of a scene containing a bright background (e.g. a specimen positioned on a white sheet of paper on plate 12) the camera actuation is accomplished by moving switch 42 leftwardly to a position engaged with contact 43.

Assuming that it is desired to take a picture of a scene containing a dim background, the four lamps 14, 16, 18 and 20 are energized by closing the associated switches 14a, 16a, 18a and 20a, thereby enabling the four lamps to brightly illuminate the subject on plate 12. Switch 40 is closed manually to energize relay coil 44. Controlled contacts 46 on the relay supply current to the exposure control 34 and shutter control 36. The exposure control controls the size of the diaphragm aperture to produce a picture reflective of the average scene brightness detected by the exposure control. The picture is taken with all four lamps 14, 16, 18 and 20 energized.

To take a picture of a scene that includes a bright background, e.g. a dark specimen on a white background, the second switch 42 is operated to engage contact 43; at this time switch 40 is in an open condition, as shown in the drawing. When switch 42 is moved from its illustrated position to a position engaged with contact 43, the two lamps 14 and 18 are momentarily de-energized; lamps 16 and 20 remain energized.

While lamps 14 and 18 are in the de-energized condition the time delay 48 produces a short time delay in the energization of relay coil 44. During this short time delay the two lamps 14 and 18 have an opportunity to assume dark conditions. Controlled contacts 46 energize the exposure control 34 and shutter control 36 while lamps 14 and 18 are still dark. The exposure control 34 thereby senses a relatively dark, or dim, background not fully illuminated by the lamps; the exposure control 34 thus produces a relatively large aperture size for overexposing the film.

At the initial opening of the camera shutter by shutter control 36 the two lamps 14 and 18 will simultaneously be energized by the relay controlled contacts 50. As the camera shutter starts to open lamps 14 and 18 begin to brighten (from the dark condition). During the major part of the shutter-open period lamps 14 and 18 are energized to the high illumination mode, along with lamps 16 and 20.

The system shown in FIG. 2 causes the exposure control 34 to sense a relatively dim scene (while lamps 14 and 18 are dark), thereby providing a relatively great (satisfactory) exposure; lamps 14 and 18 are illuminated (energized) during the major part of the shutter open period, to provide a picture that captures the the bright background along with the specimen. Delay in ignition of the lamp filaments (for lamps 14 and 18) allows the camera sufficient time to lock in the exposure sensed by exposure control 34 before lamps 14 and 18 are fully lit. The system provides ample time for registration of the additional light needed for automatic photographing of white background documents. On the other hand, the system can be used for photographing other average background documents, using switch 40 to initiate the process.

The drawings show one particular form that the invention can take. However, it will be appreciated that the invention can be practiced in various forms and configurations.

What is claimed is:

1. Apparatus for taking a picture against a relatively bright background or a relatively dim background, comprising:

a camera having a shutter control and an exposure control;

an object illuminating means having a high illumination mode and a low illumination mode;

a relay having an energizing circuit, a first control circuit connected to the shutter control and exposure control, and a second control circuit connected to said object illuminating means;

a time delay means in said relay energizing circuit; and selectively actuable switch means for energizing said relay; said switch means having a first condition wherein said object illuminating means is in its high illumination mode when the relay is initially energized; said switch means having a second condition wherein said object illuminating means is in its low illumination mode during the time delay at energization of the relay;

said object illuminating means comprising first lamp means (14,18) and second lamp means (16,20) having parallel connections with said switch means so that when said switch means is in its first condition both lamp means are energized, and when said switch means is in its second condition only said second lamp means is energeized when the relay is initially energized.

2. Apparatus for taking picture against a relatively bright background or a relatively dim background, comprising:

a camera having a shutter control and an exposure control;

an object illuminating means having a high illumination mode and a low illumination mode;

a relay having an energizing circuit, a first control circuit connected to the shutter control and exposure control, and a second control circuit connected to said object illuminating means;

a time delay means in said relay energizing circuit; and selectively actuable switch means for energizing said relay; said switch means having a first condition wherein said object illuminating means is in its high illumination mode when the relay is initially energized; said switch means having a second condition wherein said object illuminating means is in its low illumination mode during the time delay at energization of the relay;

said selectively actuable switch means comprising first and second switches (40,42) selectively operable so that the first switch energizes the relay to achieve the first condition, and the second switch energizes the relay to achieve the second condition;

said object illuminating means comprising first lamp means (14,18) and second lamp means (16,20) connected to said second switch so that said second lamp means bypasses said second switch and said first lamp means is in series with said second switch when the object illuminating means is in its high illumination mode.

3. The apparatus of claim 2, wherein said first and second switches have parallel connections to said relay energizing circuit.

4. The apparatus of claim 2, wherein said second switch is alternately connectable with said time delay means and said first lamp means.

* * * * *